J. L. FITTS.
VALVE FOR STEAM HEATING SYSTEMS OR STEAM TRAP.
APPLICATION FILED DEC. 4, 1909.

1,096,899.

Patented May 19, 1914.

WITNESSES
INVENTOR
James Logan Fitts
BY
ATTORNEY

UNITED STATES PATENT OFFICE.

JAMES LOGAN FITTS, OF MERCHANTVILLE, NEW JERSEY, ASSIGNOR TO WARREN WEBSTER & CO., A CORPORATION OF NEW JERSEY.

VALVE FOR STEAM-HEATING SYSTEMS OR STEAM-TRAP.

1,096,899. Specification of Letters Patent. Patented May 19, 1914.

Application filed December 4, 1909. Serial No. 531,338.

*To all whom it may concern:*

Be it known that I, JAMES LOGAN FITTS, a citizen of the United States, and resident of Merchantville, Camden county, Pensauken township, State of New Jersey, have invented an Improvement in Valves for Steam-Heating Systems or Steam-Traps, of which the following is a specification.

My invention has reference to automatic valves and traps, and consists of certain improvements which are fully set forth in the following specification and shown in the accompanying drawings which form a part thereof.

The object of my invention is to provide a form of automatic trap or valve especially designed for steam-heating systems and adapted to permit the removal of the water of condensation and air while restricting or preventing the escape of steam. More specifically, these valves or traps are employed on the return end of a steam-heating system for permitting the escape of the water and air from the radiators but preventing loss of steam therefrom. Usually these traps are employed in systems known as vacuum systems, but they are also adapted for use in pressure systems of steam-heating and may be employed in connection with any steam-circulating apparatus where it is desired to eliminate the water and air, or the water alone, from the system.

Figure 2:
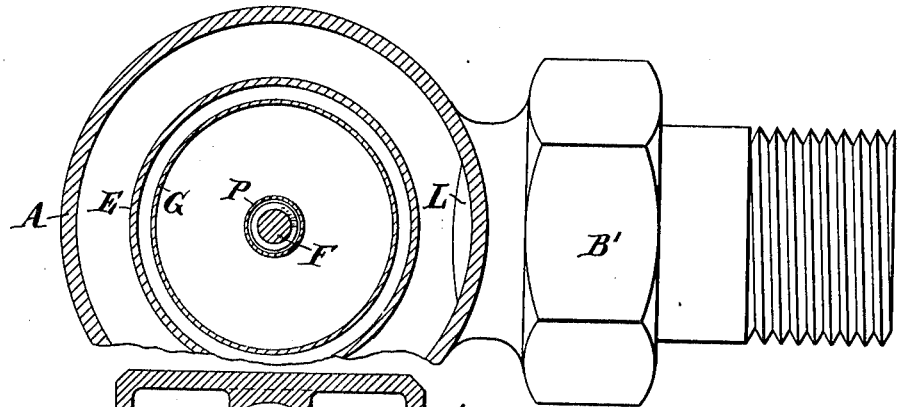
Figure 1:
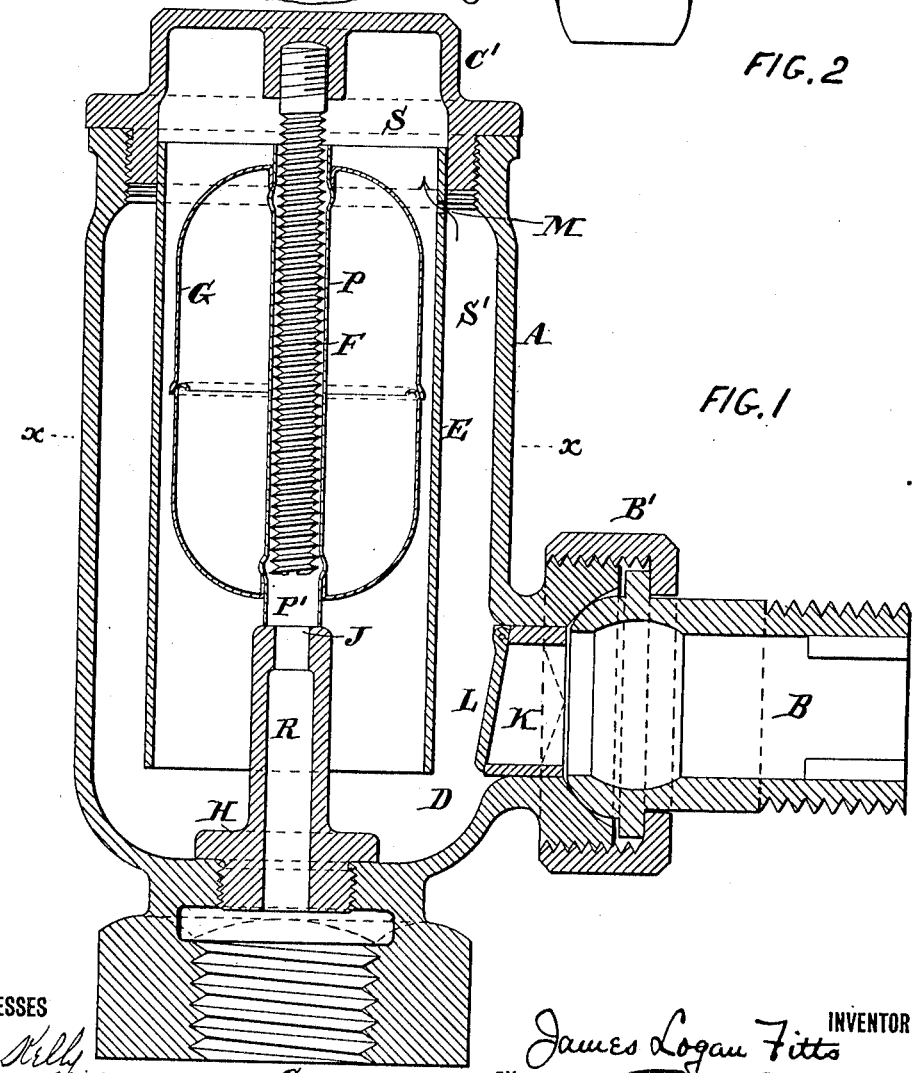

My invention consists in certain features of construction which are described hereinafter and more particularly defined in the claims; and these improvements will be understood by reference to the drawings, in which:

Figure 1 is a sectional elevation of an automatic valve or steam trap embodying my invention; and Fig. 2 is a sectional plan view of the same taken on line *x—x* of Fig. 1.

A is the body of the device and is provided with an inlet B and an outlet C. In the form shown, the inlet and outlet are arranged at right angles, but this is not essential, as any other arrangement may be provided for. The inlet B is usually made as a detachable nipple connected by a union joint as at B'.

The top of the body A is closed by a movable cap C' which is provided with a depending annular sleeve or apron E which extends to near the bottom of the body on the inside, leaving a chamber D below it. This apron E forms an inner float chamber S and an annular chamber S' between it and the sides of the body A. Opening through the apron E, near its top, is an aperture M which acts as a vent from the annular chamber S' into the float chamber S.

Attached to the cap at its center and downwardly extending, is a guide stem F, which is preferably provided with a screw-thread upon its circumference. Guided upon this screw-threaded stem F is a float G which has a diameter preferably nearly equal to the internal diameter of the tubular apron E and float chamber formed thereby, and said float is provided with a tubular center P which forms a sliding fit over the screw-threaded stem F, and is further provided with a downwardly extending annular end P' which acts as a valve piece and seats upon the seat formed at J on the upper end of the extension R of the removable seat H. The upper end or valve seat J, is preferably arranged at such a height that it is approximately in horizontal alinement with the top of the inlet opening or slightly above; however I do not restrict myself thereto, as the height of this valve seat may be changed to suit varying conditions of operation, as desired. The seat J and the extension R are made tubular, thereby providing a thoroughfare connecting with the outlet C of the body.

The inlet port on the body is provided with a sleeve or bushing K carrying upon its inner end a pivoted gate or check valve piece L, which opens inward to permit the entrance of water, but closes against its seat to prevent the outflow of water. It is evident that the bushing K may be a part of the inlet of the body, if so desired.

The operation of the device is as follows: Assuming that this automatic valve or steam trap is connected between the discharge of the radiator and the return pipe of a heating system in which return pipe there is maintained a partial vacuum, the water of condensation from the radiator, due to the steam condensation therein, will flow freely through the inlet B, through the bushing K and into the body A by pushing past the check valve L and thereby more or less fill the lower part of the body to a level such that the lower edge of the apron E is covered to provide a water seal interposed between the inlet and the outlet. This level of the water may increase until it is above the valve seat J. When this takes place the partial vacuum in the return pipe acting through the tubular sleeve P of the float G and between it and the stem F, lowers the pressure in the chambers S and S', thereby producing a lower pressure in these chambers than the pressure in the radiator exerted on the inlet B, said differential pressure causing the water to rise in the float chamber S until it acts to lift the float G. When the float G rises by its buoyancy, it lifts the valve piece P' and permits the water of condensation from the float chamber to pass through the valve seat and out into the return pipe connecting with the outlet C. While the differential pressure is also exerted in the chamber S', its action is not so responsive as in the float chamber, because of the fact that the air cannot be withdrawn from said chamber except through the single vent M. It therefore follows that the water will rise more rapidly in the float chamber S than in the annular chamber S'. When the water within the body has been lowered in the float chamber, through its discharge, to such a level that the float again causes the valve piece P' to seat upon the valve seat J, it will be found that the level of water retained within the body A will be sufficient to insure a water seal in connection with the lower part of the apron E. Any vapor which might pass into the body and find its way into the annular chamber S' or into the float chamber S, is compelled to pass through the vent formed by the helical groove provided by the helical thread of the stem F and the tubular guide P of the float. The vapor from the annular chamber S', would be required to pass through the vent M into the float chamber S before escaping by the vent passage through the float.

The air from the radiator is caused to pass through the inlet B, through the check valve L K, into the chamber S', thence through the vent M and out into the outlet C through the vent passage between the float and the stem F, and this may continue so long as any air is present. If steam should attempt to pass, it will be condensed in the long helical passage formed by the screw-thread of the guide stem F, and the water of condensation so formed will check or prevent any material escape of steam. As the water in the lower part D of the body will always seal the lower rim of the apron E, there will be practically no tendency of air to pass into the float chamber S below the float, but instead, may pass upward through the chamber S' and thence through the vent M with a comparatively unobstructed flow.

In the operation of my improved valve under conditions where there is substantially normal pressures in the radiator, that is at or about atmospheric pressure, the water of condensation will stand in the chambers S and S' at a considerable level above the inlet opening B by reason of the partial vacuum existing in the upper part of these chambers. During this action of inflow of water and air from the radiator, the same may pass through the valve L in a gradual manner and without providing a free passage through the orifice through which steam may pass. When the water has risen sufficiently high in the chamber S to lift the float G and thus open the port J, the vacuum existing in the return will exert its influence on the body of water which connects with the bottom of that in the annular chamber S', and this suction will be greater than that exerted on the top of the column of water in this chamber acting through the orifice M. The action of this greater suction on the lower portion of the water will cause this body of water to descend and as the valve L is closed as a check valve, it cannot pass into the radiator, and therefore rushes downward and thence upward in the chamber S in its endeavor to reach the outlet J, and in this action, it tends to support the column of water within the chamber S which has been sustained by the partial vacuum existing in the upper part thereof. This sustaining action holds the float up for a sufficient length of time for the column of water in the chamber S' to materially descend because of discharge of water through valve port J, but in practice, it will not descend to uncover the bottom of the apron D and ordinarily not descend below the upper part of the inlet B. It will descend, however, sufficiently to lose the force of its weight, and hence the upward impact within the chamber S, and therefore at this time enough of the water within the chamber S will have been discharged through the orifice J to lower the float and seat the valve P'. In practice, the presence of the valve L resting lightly upon its seat will enable the inlet port B to be only partly filled with water notwithstanding that the column of water in the chamber S' may rise to a considerable height, because the valve L operates to provide only sufficient passageway for water and air into the chamber S', and no possible way by which said water may flow backward from said chamber into the inlet B. By the differential between the pressure in the upper part of the chamber S' and the inlet B, the flow is always in one direction, and when the supporting vacuum for the column of water in the chamber S' is balanced or overcome by the opening of the valve P', then the water in its downward passage is forced to take a course downward and then upward into the chamber S, as the valve L prevents it passing into the inlet passage B which may be largely clear of water. In this manner the discharge at each opening of the valve P' is greater than what would result if the valve L were not employed because the valve P' is held open longer than would be the case if valve L were omitted. It is also evident that the intermittent action required in this valve is much less than it would be where the ordinary flotation alone was required to control the operation of the float valve and when the valve L was not employed.

It is a frequent occurrence in steam-heating apparatus that by shutting off the steam supply to the radiator, the steam in said radiator will condense and produce a partial vacuum within the radiator, and this will cause a tendency of air, water, and steam (if present) to flow from the return pipe backward into the radiator, thereby producing an objectionable condition which would have to be rectified when again putting the radiator into heating condition. Aside from this, such action produces objectionable water hammering and danger to the apparatus through freezing and bursting of the joints. This objectionable result is prevented in my improved steam trap or automatic valve, in that all back-flow into the radiator is prevented by provision of the hinge gate or check valve L which closes tight upon its seat the moment a differential in pressure arises which would cause a flow from the body A into the inlet B. It will be further observed that this check valve L rests upon its seat on an incline so that it normally closes by the action of gravity and hence leakage in a backward direction is particularly provided against, even where the differential in pressure to induce a back-flow is only very slight.

By my improved construction, it is also evident that the chamber D at the bottom of the body will always act to reduce the passage of free vapor through the motor, and by providing the elevated valve seat J, this chamber D forms a dirt pocket for the reception of scale and other refuse which would tend to clog the valve in a construction in which the valve seat J was at the bottom of the valve body.

The air vent M, in practice, is made sufficiently small in area to be closed to the passage of vapor by a drop of water held there by capillarity and hence, in a measure, will act as a capillary duct, but this is not essential as the long helical passage formed between the float and the stem F acts as a capillary duct of great length. It is desirable, however, that the passage M shall be sufficiently small, that while permitting the upper part of the annular chamber S' to be cleared of air, a greater differential between the upper part of the float chamber S and the inlet B will be exerted than between the upper part of the annular chamber S' and the inlet B, so as to offer as little resistance to the passage of air from the radiator by maintaining a lower column of water in the chamber S' than would be maintained in the float chamber S.

When my invention is used on pressure systems, the water will flow away by gravity after lifting the float, and the air may be forced out through the vents M and through the float while the steam would be checked by condensation in the capillary duct formed as aforesaid.

While I have shown the construction of my improved automatic valve or steam trap in the form in which I have found it excellently adapted in commercial practice, I do not restrict myself to the details, as these may be modified without departing from the spirit of the invention.

Having now described my invention, what I claim as new and desire to secure by Letters Patent, is:

1. In a device of the character described, the combination of a body part having inlet and outlet ports, a check valve arranged on the inlet and opening inwardly into the body, a raised valve seat having an opening in communication with the outlet port, a float having a valve piece closing upon the raised valve seat, an annular apron arranged within the body to provide a float chamber and having its lower free edge extending downward below the raised valve seat and terminating at a distance above the bottom of the interior of the body, and a guide for the float providing a restricted passage between the upper part of the float chamber and the outlet of the valve body through the raised seat thereof.

2. In a device of the character described, the combination of a body part having inlet and outlet ports the former opening through the side of the body, a self closing check valve arranged on the inlet and opening inwardly into the body, a raised valve seat having an opening in communication with the outlet port, a float having a valve piece closing upon the raised valve seat, an annular apron arranged within the body to provide a float chamber and having its lower free edge extending downward below the raised valve seat and terminating at a distance above the bottom of the interior of the body and said apron forming also an annular chamber between the apron and the side wall of the body and having a restricted passage between the said annular chamber and the inner or float chamber near the upper portions thereof, and a guide for the float and said guide with the float forming a restricted passage between the upper part of the float chamber and the outlet of the valve body through the raised seat thereof.

3. In a device of the character described, the combination of a body having an inlet and an outlet, a valve seat part screwed into the lower part of the body above the outlet and having a raised part terminating in a seat at an elevation approximately on a level with the top of the inlet, a cap for the body, a downwardly extending annular apron having its free edge terminating on a level approximately with the bottom of the inlet and considerably below the level of the valve seat and having a vent through its upper part forming a restricted passage communicating with the space within the apron and between the apron and the walls of the body, a guide carried by the cap, and a float guided by the guide and having a valve piece seating upon the raised valve seat and also having a vent passage through the float into the outlet through the valve seat.

4. In a device of the character described, the combination of a body having an inlet above its lower part and opening through its side and an outlet from its bottom, a self closing check valve on the inlet for permitting the inflow into the body and preventing the outflow therefrom, a valve seat part screwed into the lower part of the body above the outlet and having a raised part terminating in a seat at an elevation approximately on a level with the top of the inlet, a cap for the body, a downwardly extending annular apron secured to and removable with the cap having its free lower edge terminating on a level approximately with the bottom of the inlet and considerably below the level of the valve seat and having a vent through its upper part forming a restricted passage communicating with the space within the apron and between the apron and the walls of the body, a guide carried by the cap, and a float guided by the guide and having a valve piece seating upon the raised valve seat and also having a vent passage through the float into the outlet through the valve seat.

In testimony of which invention, I hereunto set my hand.

JAMES LOGAN FITTS.

Witnesses:
PHILIP Y. QUINN,
F. JOSEPH MILLER.

---

Copies of this patent may be obtained for five cents each, by addressing the "Commissioner of Patents, Washington, D. C."